United States Patent
Gaemmerler et al.

(10) Patent No.: US 8,783,762 B2
(45) Date of Patent: Jul. 22, 2014

(54) SLEEVE FOR THE GUIDING-THROUGH OF AT LEAST ONE LINE

(71) Applicant: Bayerische Motoren Werke, Munich (DE)

(72) Inventors: Manfred Gaemmerler, Gruenwald (DE); Michael Gabriel, Simpsonville, SC (US); Johann Brunner, Neumarkt St. Veit (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/711,104

(22) Filed: Dec. 11, 2012

(65) Prior Publication Data

US 2013/0160236 A1    Jun. 27, 2013

(30) Foreign Application Priority Data

Dec. 22, 2011   (DE) .......................... 10 2011 089 515

(51) Int. Cl.
*B60N 99/00*        (2006.01)

(52) U.S. Cl.
USPC ......................................................... 296/208

(58) Field of Classification Search
USPC ............................ 296/76, 208; 16/2.1; 29/428
See application file for complete search history.

(56) References Cited

U.S. PATENT DOCUMENTS

| 4,494,779 A | 1/1985 | Neff et al. |
| 2010/0059152 A1* | 3/2010 | Brunner et al. ............... 150/154 |

FOREIGN PATENT DOCUMENTS

| DE | 33 40 664 A1 | 5/1985 |
| DE | 10 2007 016 183 A1 | 10/2008 |
| GB | 2 149 469 A | 6/1985 |

OTHER PUBLICATIONS

German Search Report dated Oct. 15, 2012 w/partial English translation (ten (10) pages).

* cited by examiner

*Primary Examiner* — Lori Lyjak
(74) *Attorney, Agent, or Firm* — Crowell & Moring LLP

(57) ABSTRACT

For facilitating mounting of a head section of a sleeve, which is used for guiding a line, in a mounting opening, a reinforcing part is provided. The reinforcing part is placed in the radial direction on the line only after the guiding-through of the line and the insertion of the head section in the mounting opening. The reinforcing part is divided at least into two mutually displaceable sections. After the placing of the reinforcing part on the line, the two sections of the reinforcing part are guided together. Subsequently, the reinforcing part is inserted in the axial direction into the head section of the sleeve. By use of the reinforcing part, the sealing effect of the sleeve is improved, and a twisting of the sleeve in the mounting opening is prevented.

15 Claims, 5 Drawing Sheets

SLEEVE FOR THE GUIDING-THROUGH OF AT LEAST ONE LINE

CROSS REFERENCE TO RELATED APPLICATION

This application claims priority under 35 U.S.C. §119 from German Patent Application No. 10 2011 089 515.9, filed Dec. 22, 2011, the entire disclosure of which is herein expressly incorporated by reference.

BACKGROUND AND SUMMARY OF THE INVENTION

The invention relates to a sleeve for guiding-through at least one line, as well as to a method for guiding-through the line. In particular, the invention relates to a sleeve for guiding at least one line through a component, the sleeve having a hose-type center section and at least one end-side head section, which is insertable into a mounting opening of the component.

A sleeve of the above-mentioned type for guiding-though lines, for example, in a motor vehicle, is known from German patent document DE 33 40 664 A1. The known sleeve has a hose-type center section with two end-side head sections. Reinforcing parts in the form of stiffening rings are inserted into the head sections. The stiffening rings consist of a plastic material that is firmer than the sleeve itself. As a result of the stiffening rings, a reliable fit of the head sections is achieved in the corresponding assembly openings of the body of the motor vehicle.

It is an object of the present invention to further develop the known sleeve; in particular to make a facilitated mounting possible.

This and other objects are achieved by a sleeve for guiding at least one line through a component, the sleeve having a hose-type center section and at least one end-side head section, which is insertable into a mounting opening of the component. A reinforcing part in the head section is designed such that it is placeable on the line in the radial direction. A method is provided for the facilitated mounting of the sleeve. The method for guiding a line with a pushed-on sleeve through a mounting opening of a component, the sleeve having a hose-type center section and at least one end-side head section, which can be inserted into the mounting opening, includes the acts of: a) guiding the line with the pushed-on sleeve through the mounting opening, b) inserting of the head section into the mounting opening, c) placing a reinforcing part on the line with a movement direction radial to the line, and d) inserting the reinforcing part into the head section by displacing the reinforcing part in the axial direction of the line.

It is an aspect of the invention to construct the reinforcing part as a component separate from the head section and to design it such that it can be subsequently placed in the radial direction onto a line without having to be "threaded onto" the line together with the sleeve. The reinforcing part is, for example, constructed in one piece in the shape of an open ring, the opening being dimensioned to be so large that the cross-section of the line can pass through the clear width of the opening. Naturally, the reinforcing part can be elastically deformed to a limited extent during the mounting onto the line, so that the clear width of the opening is temporarily enlarged. As an alternative, the reinforcing part may consist of two sections which can be inserted into the head section independently of one another.

In a preferred embodiment of the invention, the reinforcing part is constructed in a closed ring shape for achieving a stiffness that is as high as possible, and is divided into at least two ring sections which permit an opening of the ring. A radial mounting of the reinforcing part onto the line is thereby made possible, so that a threading of the line through the reinforcing part will not be necessary.

In a particularly advantageous embodiment of the invention, the reinforcing part has two ring sections which are mutually inseparably connected by way of a first connection area. The first connection area permits an at least limited displacement of the two ring sections with respect to one another, preferably a swiveling of the ring sections about an axis in the first connection area. By way of a second connection area, the two ring sections can be separably connected with one another. It thereby becomes possible to displace the two ring sections from their closed ring-shaped position into an open mounting position. The opening permits the radial mounting of the reinforcing part onto the at least one line. Compared to a multi-piece reinforcing part, a simpler handling during the mounting process is achieved by the inseparable connection of the two ring sections.

The two ring sections are, for example, mutually connected by way of a film hinge.

According to a preferred further development of the invention, the second connection area is constructed as a clip connection. When the line is removed, for example, for repair purposes, the reinforcing part can therefore be separated from the sleeve and from the line in a simple manner.

In an embodiment of the invention, the reinforcing part is constructed with a lateral surface extending approximately parallel to the longitudinal direction of the line and with a flange extending approximately perpendicular to the longitudinal direction of the line. The lateral surface of the reinforcing part is received on its exterior side along a correspondingly constructed interior surface of the head section of the sleeve. The flange forms a stop for the reinforcing part.

According to a further development of the invention, mutually facing elements of a detent device are provided on the reinforcing part and on the head section for fixing the reinforcing part in the head section of the sleeve.

For ensuring a uniform alignment of the reinforcing part in a symmetrically designed head section, corresponding devices, for example, in the form of an elevation and a pertaining recess, are provided on the reinforcing part and the head section.

Corresponding to the shape of the mounting opening, the reinforcing part is, for example, circular, oblong, ellipsoid, oval or of another design.

The sleeve with a reinforcing part according to the invention can, for example, be used particularly advantageously when a sliding agent is used for facilitating the mounting of the head section of the sleeve in a mounting opening deviating from a circular shape. Since it will still take a certain time after the mounting until the friction-reducing effect of the sliding agent diminishes, there is the risk that, immediately after the mounting of the sleeve, the head section may twist in the mounting opening, which, because of the no longer congruent geometries of the head section and the mounting opening, may result in considerable leakiness. As a result of the insertion of the reinforcing part in the head section, the head section will be held in a torsion-proof manner in the mounting opening.

By use of the method of the invention, the mounting operation is clearly facilitated in the case of prefabricated lines in the case of which, within the scope of a preassembly, at least one sleeve has already been mounted in its final position on the line. In the case of such lines, the sleeve together with the line has to be pushed completely through a first mounting opening. For this purpose, the at least one head section of the sleeve has to have a sufficient deformability in order to be able to pass through the mounting opening at reasonable expenditures of force and without the risk of damage to the head section. It particularly has to be avoided that the material of the head section tears while being guided through the mounting opening.

According to the invention, the prefabricated line, including the sleeve already pushed onto the line, is guided through the first mounting opening. Since the at least one head section of the sleeve consists of a comparatively easily deformable elastic material, this operation can take place with a relatively low expenditure of force. The head section is subsequently inserted into the mounting opening. Finally, the reinforcing part is placed with its opening in the radial direction on the line and is pushed axially into the head section. As a result of the subsequent insertion of the reinforcing part into the head section, the head section of sleeve will be stiffened only after the conclusion of the laying of the line. A secure fixing of the head section and a perfect sealing effect are therefore achieved in the mounting opening.

A particularly advantageous use of the invention is achieved, for example, in the case of motor vehicles with a hatchback, wherein a line extends between the stationary vehicle body of the motor vehicle and the swivelable hatchback, the line being guided through a sleeve in this area. In this case, a first head section of the sleeve is inserted into a first mounting opening at the vehicle body, and a second head section of the sleeve is inserted into a second mounting opening at the hatchback. The first vehicle-body-side mounting opening is preferably situated at a water channel in the area of the opening of the vehicle body that can be closed by the hatchback. The line is a cable harness of the motor vehicle which is guided with a cable section through the two mounting openings to the hatchback. This cable section of the cable harness is, among other things, used for the electric linking of rear lights, of a rear window wiper, of a rear window antenna, etc. The cable section of the cable harness is guided together with a sleeve already mounted in the final position through the first mounting opening in the water channel. In the following, the line is laid through the second mounting opening into the hatchback. The sleeve has a center section for guiding the line between the vehicle body and the hatchback as well as two head sections for the insertion into the two mounting openings.

In order to particularly prevent the penetration of water into the interior of the motor vehicle by way of the first mounting opening in the water channel, after the threading of the line (together with the sleeve) through the first mounting opening and the insertion of the first head section of the sleeve into the mounting opening, at least the first head section, thus the vehicle-body-side head section, is equipped with a reinforcing part. When the motor vehicle is driving in rain, a considerable amount of water occurs in the water channel, so that the first head section of the sleeve has to meet increased tightness demands. Naturally, a reinforcing part can also be inserted into the second head section, thus, into the hatchback-side head section. However, as a rule, a complete sealing-off is not necessary in this area because the mounting opening leads into a so-called wet area in the interior of the hatchback, which wet area has discharge openings for seeped-in water.

"Lines" in the sense of the invention are all types of elongated formations, such as electric cables, media-carrying pipes (such as washing-water pipes), cable pull lines, etc. In particular, the "line" is a line interconnection with several individual lines, such as a cable harness or tree, as mentioned above in the form of an example. Naturally, electric and non-electric lines can also be combined into a line interconnection.

The invention basically relates to any type of sleeves, particularly sleeves on at least one moving component. The invention preferably relates to sleeves on a moving component of a motor vehicle, mainly sleeves on flaps and doors of motor vehicles. Since, for example, in the case of modern motor vehicles, a plurality of lines are combined in a line interconnection, such as particularly a cable harness, the guiding-through of a line interconnection is becoming increasingly difficult. The sleeve according to the invention with the subsequently mountable reinforcing part therefore has a particularly advantageous effect.

The sleeve basically protects the line from damage, for example, from an uncontrolled bending of the line in the case of moving components between which the line is laid. In addition, the sleeve causes a sealing-off at the locations at which the line passes through the mounting opening(s), so that the mounting opening(s) is or are protected from the entering of moisture, water and dirt.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
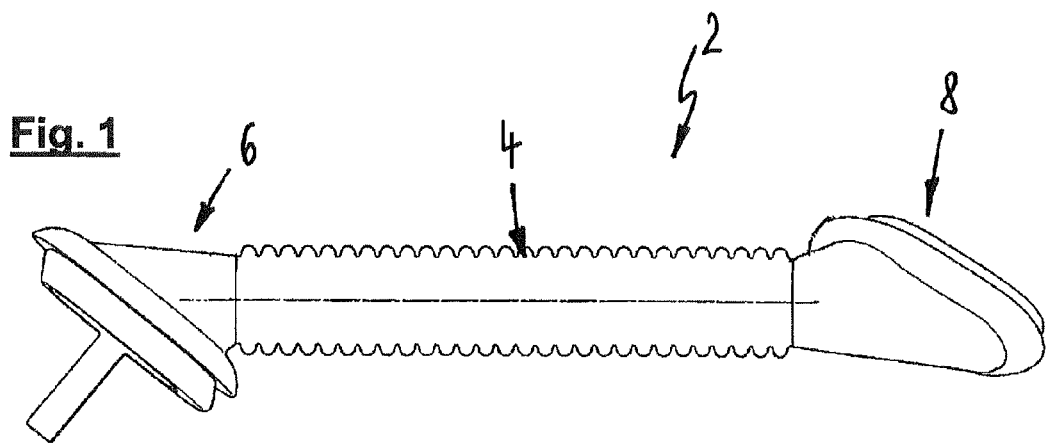
FIG. 1 is a lateral view of a sleeve.
Figure 2:
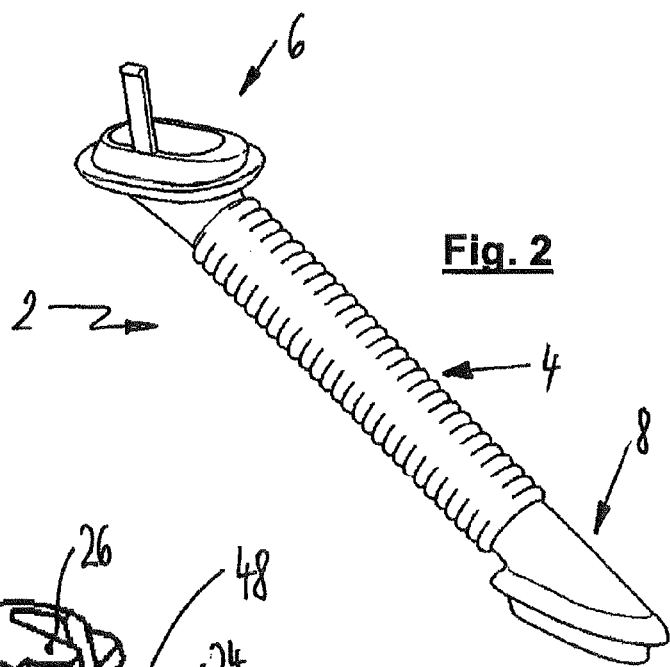
FIG. 2 is a perspective view of the sleeve of FIG. 1.

As illustrated particularly in FIGS. 1 and 2, a sleeve, which as a whole is indicated by reference number 2, for the guiding—through of a line that is not shown, has a hose-type center section 4 as well as first and second head sections 6 and 8, respectively. The center section 4 has a bellows-type construction in order to permit an angular maneuverability that is as large as possible. The head sections 6 and 8 are intended to be secured into mounting openings.

Figure 10:
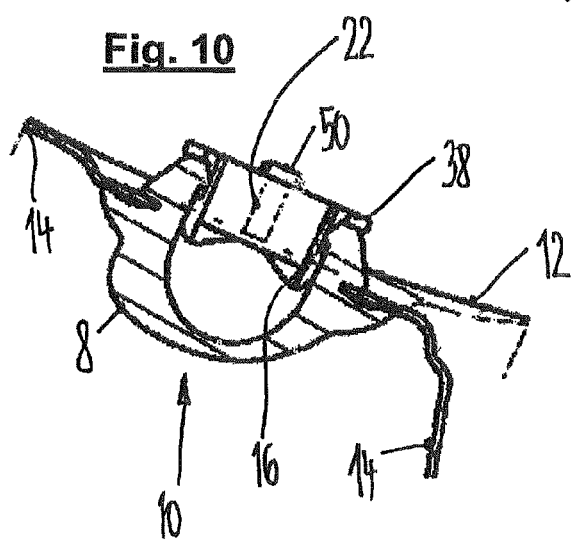
FIG. 10 is a sectional view along the intersection line X-X in FIG. 9.
Figure 11:
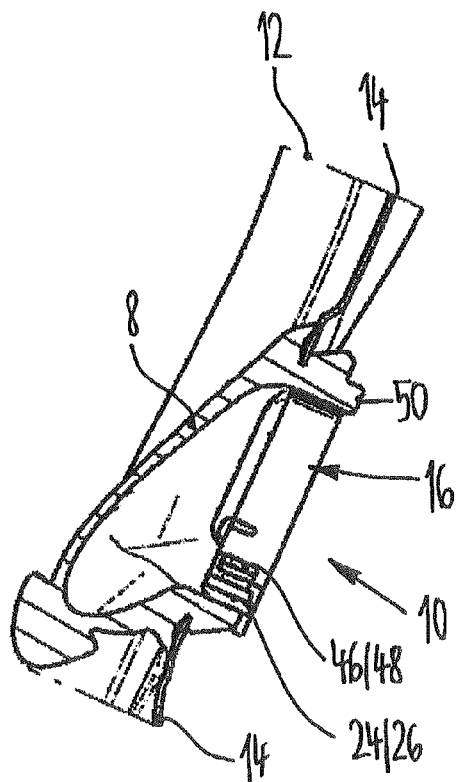
FIG. 11 is a sectional view along the intersection line XI-XI in FIG. 9.

FIGS. 10 and 11 show a mounting opening 10 into which the second head section 8 inserted. The mounting opening 10 is, for example, a passage opening in a vehicle-body-side water channel 12 of a hatchback opening of a motor vehicle. The reference number 14 characterizes the sheet metal flange in the area of the mounting opening 10.

Figure 3:
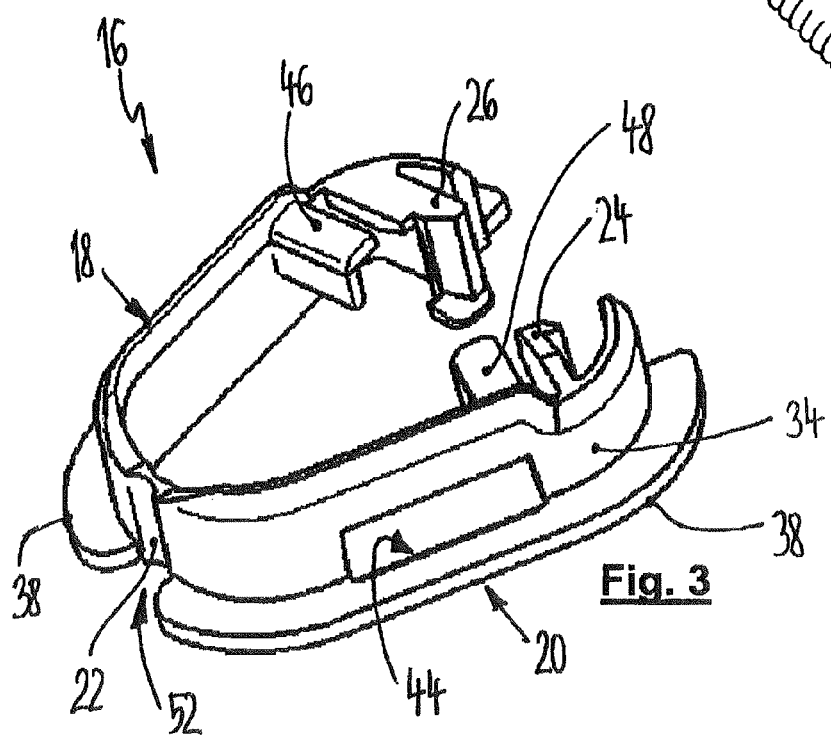
FIG. 3 is a perspective view of a reinforcing part for the sleeve.
Figure 4:
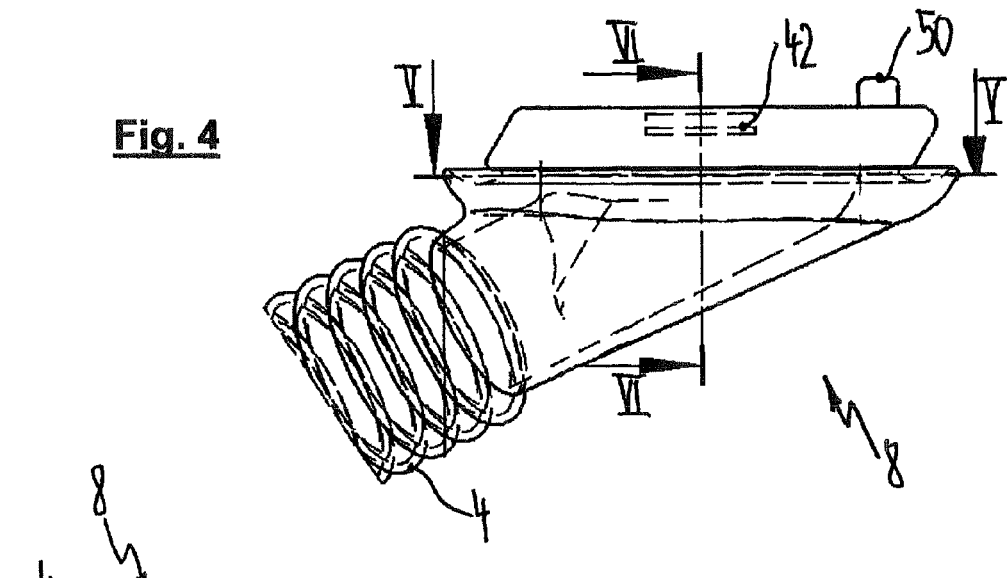
FIG. 4 is a view of an enlarged representation of a head section of the sleeve.
Figure 5:
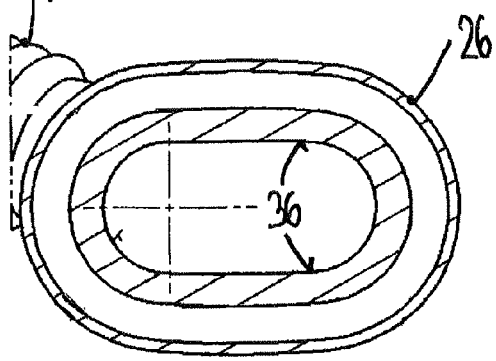
FIG. 5 is a sectional view along the intersection line V-V in FIG. 4.
Figure 6:
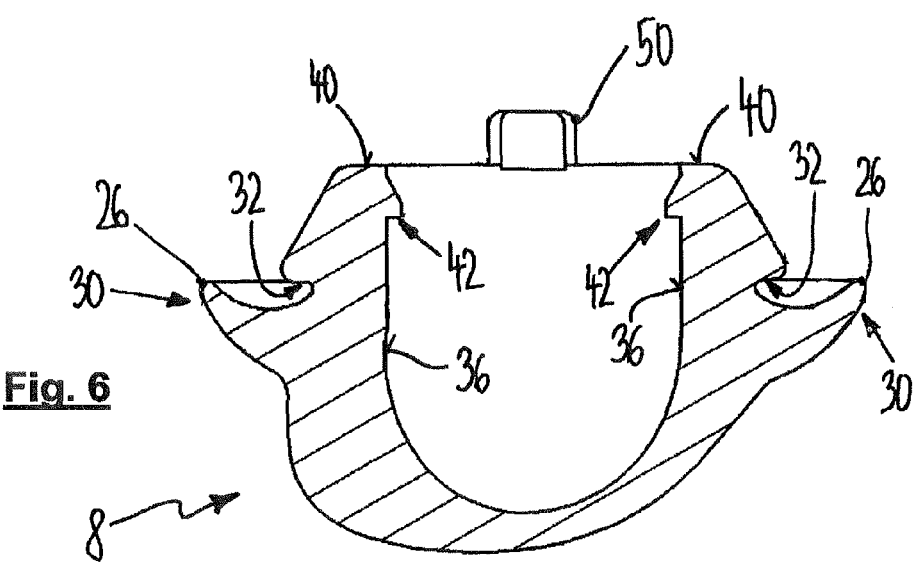
FIG. 6 is a sectional view along the intersection line VI-VI in FIG. 4.
Figure 7:
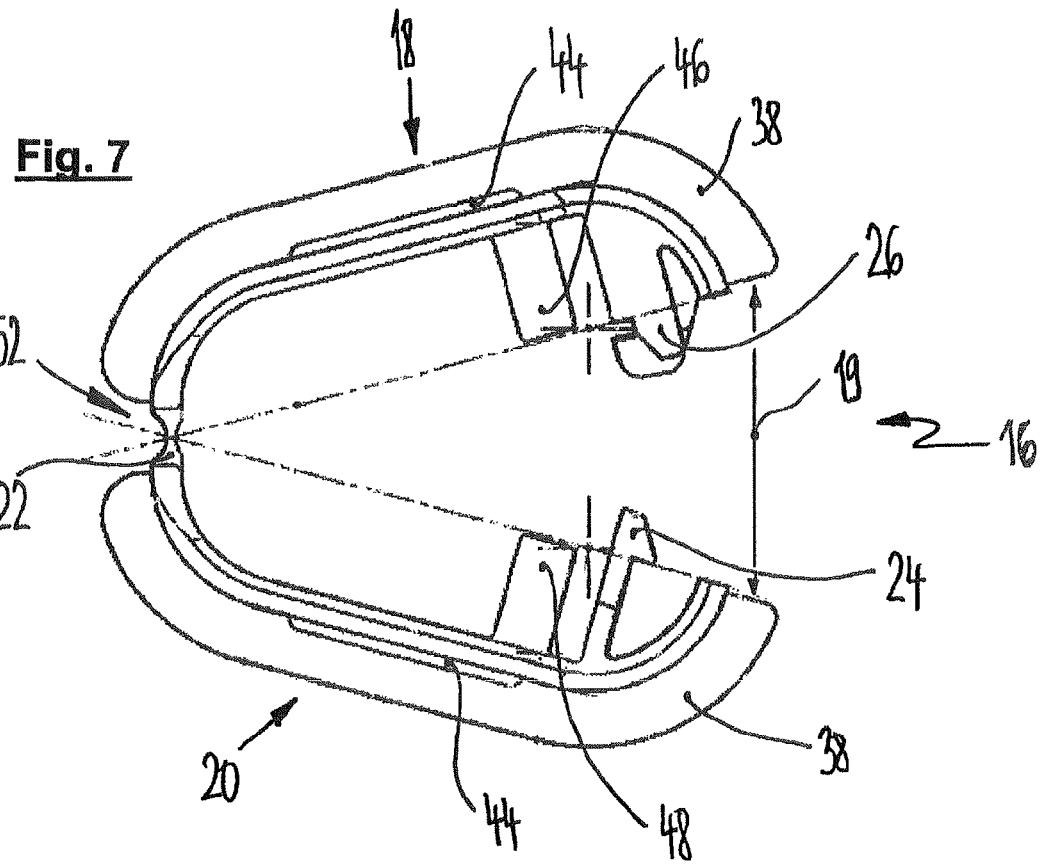
FIG. 7 is a top view of the reinforcing part of FIG. 3.
Figure 8:
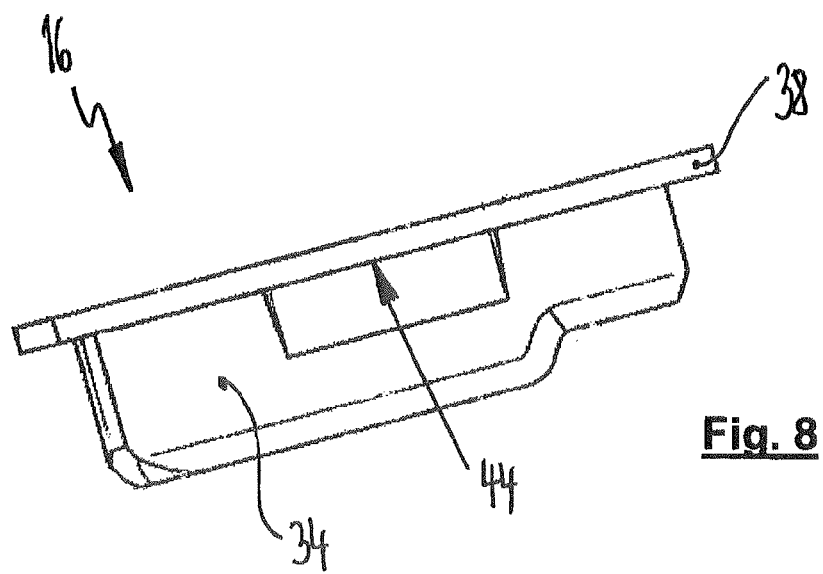
FIG. 8 is a lateral view of the reinforcing part of FIG. 3.

FIGS. 3, 7 and 8 illustrate a reinforcing part 16 which is designed for reinforcing the head section 8. Corresponding to the elongated-hole-type shape of the mounting opening 10 (see FIG. 9) and of the head section 8, the reinforcing part 16 also has a corresponding geometry in its closed position. The reinforcing part 16 is composed of two sections 18 and 20, which are inseparably connected with one another at their first end sections by way of a film hinge 22. At their second end sections, the sections 18 and 20 can be separably connected by way of a clip connection with an elastic detent hook 24 and an abutment 26 to form a closed ring.

The sleeve 2 consists of a synthetic material, for example, EPDM. In particular, EPDM 60 may be used, which can be elastically deformed with a comparatively low expenditure of force. The reinforcing part 16 is produced of a synthetic material with a clearly higher stiffness, for example, of PA 6.

The head section 8 of the sleeve 2 is intended to be buttoned into the sheet metal flange 14 of the mounting opening 10. For this purpose, the head section 8 has a surrounding sealing lip 30. The contact area of the sealing lip 30 on the sheet metal flange 14 has the reference number 26. A surrounding contact shoulder 32 for the sheet metal flange 14 is constructed opposite the sealing lip 30.

Figure 9:
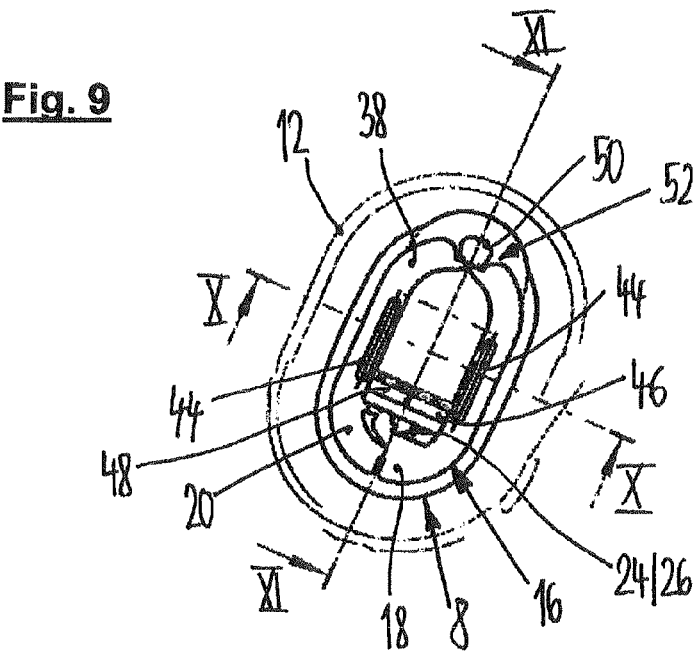
FIG. 9 is a bottom view of the head section of the sleeve inserted into a mounting opening, with an inserted reinforcing part.

The head section 8 and the reinforcing part 16 are illustrated in the assembled condition in FIGS. 9 to 11. The reinforcing part 16 has a jacket section 34 which, in the assembled condition, extends parallel to the interior surface 36 of the head section 8 and therefore parallel to the not shown line. On the top side, the reinforcing part 16 has a flange 38 which projects radially to the outside, is aligned perpendicular to the line and forms an axial stop for the reinforcing part 16 while interacting with the top side 40 of the head section 8.

For fixing the reinforcing part 16 in the head section 8, a detent device is provided, with detent projections 42 on the interior surface 36 of the head section 8 and corresponding window-type detent openings 44 in the reinforcing part 16. In addition, the reinforcing part 16 has mutually facing webs 46 and 48, whose face sides are spaced with respect to one another in the closed condition of the reinforcing part 16. In order to ensure, in view of the symmetrical shape of the jacket section 34 and the interior surface 36, a clear position assignment of the head section 8 and the reinforcing part 16, a projection 50 is provided at the head section 8 and, on the reinforcing part 16, a corresponding recess 52 is provided in the flange 38.

Figure 12:
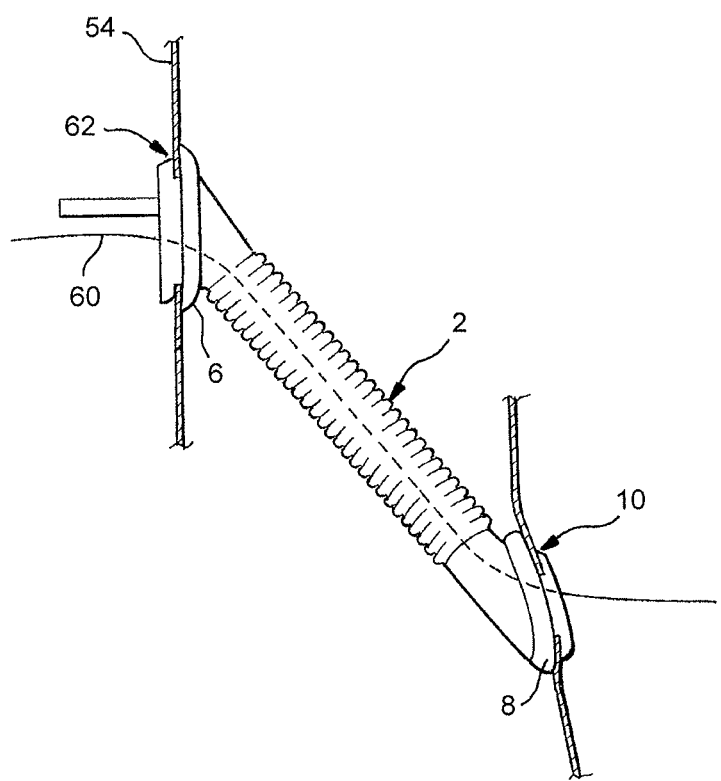
FIG. 12 is a schematic diagram of a hatchback having a mounting opening for a head section of the sleeve.

The mounting operation for a line with a sleeve 2 already preassembled on the line is as follows: First, the line together with the sleeve 2 is guided through a first mounting opening 10. First, the head section 6 is guided through, and subsequently the head section 8 passes through the first mounting opening 10. Since, during the guiding-through of the sleeve 2, no reinforcing parts 16 are inserted into the head sections 6 and 8 of the sleeve 2, the sleeve 2 can be guided through the first mounting opening 10 at low expenditures of force and without any damage. Subsequently, the line together with the head section 6 of the sleeve is guided through a second mounting opening. Now, the two head sections 6 and 8 of the sleeve 2 are buttoned into the first mounting opening 10 in the water channel and into the second mounting opening 62 at the hatchback 54, respectively, as shown in FIG. 12. The reinforcing part 16 is then placed, in the opened condition according to FIGS. 3 and 7, wherein the sections 18 and 20 are mutually swiveled with respect to one another about an axis formed by the film hinge 22, in the radial direction onto the line. In FIG. 7, the opening has the reference number 19. The placing of the reinforcing part 16 onto the line 60 (FIG. 12) takes place from the interior side of the vehicle body, thus from the rear side of the sheet metal flange 14.

By closing the clip connection 24, 26, the reinforcing part 16 is joined to form a ring and is pushed in the axial direction into the head section 8 of the sleeve, so that the installation position is obtained that is illustrated in FIGS. 9 to 11 in the mounting opening 10. The head section 8 reinforced by the reinforcing part 16 is distinguished by an improved sealing between the sleeve 2 and the sheet metal flange 14. In addition, a twisting of the sleeve 2 in the mounting opening 10 is prevented.

Analogously, after the insertion of the head section 6 into the second mounting opening, a reinforcing part can also be inserted into the head section 6.

The invention can be summarized as follows: For facilitating the mounting of a head section 8 of a sleeve 2, which is used for the guiding-through of a line, in a mounting opening 10, a reinforcing part 16 is provided. The reinforcing part 16 is placed in the radial direction onto the line only after the guiding-through of the line and the insertion of the head section 8 into the mounting opening 10. For this purpose, the reinforcing part 16 is divided into at least two mutually displaceable sections 18 and 20. After the placing of the reinforcing part 16 onto the line, the two sections 18 and 20 of the reinforcing part 16 are moved together. Subsequently, the reinforcing part 16 is inserted in the axial direction into the head section 8 of the sleeve 2. As a result of the reinforcing part 16, the sealing effect of the sleeve 2 is improved and a twisting of the sleeve 2 in the mounting opening 10 is prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for guiding at least one line through a component, comprising:
   a sleeve configured to surround the line, the sleeve having a hose-like center section and at least one end-side head section, the end-side head section being operatively configured to be insertable into a mounting opening of the component; and
   a reinforcing part operatively configured for the head section, the reinforcing part being configured to be placeable around the line from a radial direction, and insertable axially with respect to the line into an interior of the head section so as to be arranged between the line and the head section.

2. The apparatus according to claim 1, wherein the reinforcing part has a ring-shape and is divided into at least two partial ring sections, the two partial ring sections being mutually displaceable toward one another such that the reinforcing part is configurable into an open ring-shape.

3. The apparatus according to claim 2, wherein the two partial ring sections are inseparably connected with one another at mutually facing first end sections, and are separably connectable with one another at mutually facing second end sections.

4. The apparatus according to claim 3, comprising:
   a film hinge operatively configured to mutually connect the first end sections of the two partial ring sections of the reinforcing part.

5. The apparatus according to claim 3, further comprising:
a clip connection operatively configured to connect the second end sections of the two partial ring sections of the reinforcing part.

6. The apparatus according to claim 4, further comprising:
a clip connection operatively configured to connect the second end sections of the two partial ring sections of the reinforcing part.

7. The apparatus according to claim 1, wherein the reinforcing part comprises:
a jacket section;
a flange;
wherein, in an installation position of the reinforcing part in the head section of the sleeve, the jacket section extends substantially parallel to a longitudinal direction of the line, and the flange extends substantially transverse to the longitudinal direction of the line.

8. The apparatus according to claim 3, wherein the reinforcing part comprises:
a jacket section;
a flange;
wherein, in an installation position of the reinforcing part in the head section of the sleeve, the jacket section extends substantially parallel to a longitudinal direction of the line, and the flange extends substantially transverse to the longitudinal direction of the line.

9. The apparatus according to claim 1, wherein the head section of the sleeve and the reinforcing part have corresponding detent elements operatively configured to positionally fix the reinforcing part at the head section.

10. The apparatus according to claim 1, wherein the head section and the reinforcing part have corresponding components configured to ensure an unambiguous positional assignment of the reinforcing part and the head section.

11. The apparatus according to claim 1, wherein the reinforcing part has one of a circular, oblong, ellipsoidal, and oval shape.

12. A method for guiding a line surrounded by a sleeve through a mounting opening of a component, the sleeve having a hose-like center section and at least one end-side head section insertable into the mounting opening, the method comprising the acts of:
guiding the line with the surrounding sleeve through the mounting opening;
inserting the head section into the mounting opening;
placing a reinforcing part around the line by moving the reinforcing part in a radial direction toward the line; and
inserting the reinforcing part into an interior of the head section by moving the reinforcing part in an axial direction of the line.

13. The method according to claim 12, wherein the mounting opening is arranged at a vehicle-body-side water channel of a motor vehicle, and the sleeve receives the line extending from a vehicle body to a hatchback of the motor vehicle, the method further comprising the act of inserting a second head section of the sleeve into a second mounting opening located at the hatchback of the motor vehicle.

14. A method for facilitating mounting of a head section of a sleeve usable for guiding a line through a mounting opening, the method comprising the acts of:
guiding a line together with the sleeve in a first direction through the mounting opening such that the head section of the sleeve is inserted into the mounting opening;
after the guiding of the line together with the sleeve and the insertion of the head section in the mounting opening, placing a reinforcing part on the line from a radial direction relative to an axial length of the line, wherein the reinforcing part is divided into at least two mutually displaceable sections;
after placing the reinforcing part on the line from the radial direction, guiding the two mutually displaceable sections together to form an open ring; and
after forming the reinforcing part as the open ring on the line, inserting the reinforcing part in an axial direction of the line into an interior of the head section of the sleeve within the mounting opening.

15. The method according to claim 14, wherein the mounting opening is in a vehicle-body-side water channel of a motor vehicle having a hatchback, a second head section of the sleeve being inserted into a second mounting opening located at the hatchback.

\* \* \* \* \*